US009141933B2

(12) United States Patent
Xiang et al.

(10) Patent No.: US 9,141,933 B2
(45) Date of Patent: Sep. 22, 2015

(54) METHOD AND SYSTEM FOR GENERATING A PERSONALIZED REPORT WITH REUSABLE PARAMETERS

(75) Inventors: Yuanyuan Xiang, Los Altos, CA (US); Bhanu Mohanty, Santa Clara, CA (US); Swati Nimkar, Fremont, CA (US); Harish Tejwani, Sunnyvale, CA (US)

(73) Assignee: SAP SE, Walldorf (DE)

( * ) Notice: Subject to any disclaimer, the term of this patent is extended or adjusted under 35 U.S.C. 154(b) by 587 days.

(21) Appl. No.: 12/391,412

(22) Filed: Feb. 24, 2009

(65) Prior Publication Data

US 2010/0218092 A1 Aug. 26, 2010

(51) Int. Cl.
| | |
|---|---|
| *G06F 17/00* | (2006.01) |
| *G06F 3/14* | (2006.01) |
| *G06Q 10/10* | (2012.01) |
| *G06F 17/30* | (2006.01) |
| *G06F 17/24* | (2006.01) |

(52) U.S. Cl.
CPC .............. *G06Q 10/10* (2013.01); *G06F 17/248* (2013.01); *G06F 17/30011* (2013.01); *G06F 17/30867* (2013.01)

(58) Field of Classification Search
CPC ... G06F 17/248; G06F 17/212; G06F 17/243; G06F 8/71; G06F 17/30011; G06F 17/30569; G06F 17/30867; G06F 17/30914; G05B 2219/2326
USPC ......... 715/221, 222, 224, 225, 226, 243, 248, 715/273
See application file for complete search history.

(56) References Cited

U.S. PATENT DOCUMENTS

| | | | |
|---|---|---|---|
| 7,565,394 B1* | 7/2009 | Stewart et al. ................ 709/201 |
| 7,640,496 B1* | 12/2009 | Chaulk et al. ................ 715/243 |
| 2002/0062325 A1* | 5/2002 | Berger et al. ................. 707/518 |
| 2003/0074454 A1* | 4/2003 | Peck ............................. 709/228 |
| 2004/0135805 A1* | 7/2004 | Gottsacker et al. ........... 345/751 |
| 2006/0048048 A1* | 3/2006 | Welcker et al. ............... 715/513 |
| 2006/0206358 A1* | 9/2006 | Beaver ............................. 705/2 |
| 2007/0169021 A1* | 7/2007 | Huynh et al. ................. 717/136 |
| 2008/0022107 A1* | 1/2008 | Pickles et al. ................ 713/176 |
| 2009/0210398 A1* | 8/2009 | Williamson et al. ............. 707/3 |

* cited by examiner

*Primary Examiner* — Kavita Padmanabhan
*Assistant Examiner* — Ariel Mercado
(74) *Attorney, Agent, or Firm* — Schwegman Lundberg & Woessner, P.A.

(57) ABSTRACT

Methods and systems for generating personalized reports are disclosed. In some embodiments, a report generating application or service facilitates generating reports that can be personalized on a per-user and per-report basis. Accordingly, after personalizing a report to include only those columns desired, and formatting the report to have the columns appear in a desired order, the report generating application or service enables a user to save the personalization preferences to a file. Upon receiving a subsequent report request from the same user, the report generating application or service automatically generates the report in accordance with the user's saved personalization preferences. In addition to personalizing the report by specifying the particular columns and format, a user may establish, and save for later use, other report parameters (e.g., such as a date range) that are required in order to generate the report.

18 Claims, 6 Drawing Sheets

METHOD AND SYSTEM FOR GENERATING A PERSONALIZED REPORT WITH REUSABLE PARAMETERS

TECHNICAL FIELD

The present disclosure generally relates to generating reports. Some example embodiments relate more specifically to methods and systems for generating personalized reports, at runtime, in accordance with previously established personalization preferences of a user.

BACKGROUND

A variety of tools and methods exist for generating and displaying reports. For instance, one commonly used application for generating reports, particularly in a business intelligence context, is a report generating application referred to as Crystal Reports. Crystal Reports is a software application available from SAP AG that can be used to design and generate reports by pulling data from a wide range of data sources.

Typically, when a business entity uses a report generating application, such as Crystal Reports, the application includes a set of original or master reports, or more precisely, master report definitions. A report definition is a file that specifies the format and source of data to be included in a particular report. Accordingly, the report generating application utilizes the report definition to generate an instance or version of a particular report. Many conventional report generating applications include features, or come with separate applications, that allow for a user to customize a master report definition to generate customized report definitions. Customized report definitions can be defined to enhance or replace the master reports, and are generally useful for displaying the specific data that is applicable to the nature of the particular business entity.

Each report, whether a master report or a customized report, typically contains a set of fields that are displayed as columns in a table format. Oftentimes users only want to view a report with a subset of the columns of the original report, and this is achieved through the process of report personalization. Traditionally, personalizing a report has been achieved through the same, or a very similar, process as is used for customizing a report. For instance, when personalizing a report, the user modifies the definition of an original report (e.g., a master or customized report definition) by removing the columns and column headings that the user does not want displayed on the report. The user may also need to manually move the remaining columns and column headings in order to fill in the blank space left by the removed columns. The user then saves a copy of the modified report, and then generates an instance of the modified report for viewing.

A variety of problems exist with the way in which reports are personalized using conventional report generating applications, such as Crystal Reports. One issue with the current methods of report personalization is that each user has to have both the skills and permissions (e.g., file access permissions) to modify a report definition for each original (e.g., default or customized) report. Typically, a large number of users may have permission to generate and view a report, but it is not always the case that those users will have permission to modify or personalize the report definition for the report. Furthermore, not all users will have working knowledge of the report design tools, features and user interfaces that are used to modify or personalize a report definition.

Typically, when a report is personalized, the modified report definition is saved as a new report definition, independent of the original. This is problematic for a number of reasons. First, managing the reports (specifically, the report definitions) becomes a hassle as multiple personalized reports with similar names may be generated, making it difficult for a user to determine which report is the correct report. Additionally, because a personalized report definition is independent of the original report definition from which it was generated, any changes made to the original do not carry over or flow through to the personalized report definition. For instance, if the original report definition is modified such that in the modified report definition, data is selected from a different data source than in the original report definition, or a field is formatted differently, the modification will not flow through to the personalized report definition. Consequently, with conventional report generating applications, to keep a personalized report in unison with its original counterpart, a user may be forced to periodically update the personalized report definition to reflect any changes made to the original report definition.

Another issue that frequently arises with conventional report generating applications involves user inputs—referred to herein as report parameters—that are required to generate an instance of a report. Often, when a user wants to generate a report, the user will be prompted to provide one or more report parameters (e.g., a date range) before the user can generate and view the report. Traditionally, these report parameter values have to be entered by the user every time the user logs in to the report generating application or service and generates an instance of the report to view. Often, the report parameter values do not change between user sessions. Consequently, the user is forced to perform a tedious data entry process to fill in the report parameter values each time the user generates and views the report. This is especially inconvenient when the report definition requires that many report parameters be specified in order to generate an instance of the report.

SUMMARY

A method and system for generating personalized reports are described. In some embodiments of the invention, a computer-based reporting application or service is accessible via an online enterprise portal and enables a user to personalize a report by specifying report personalization preferences. For instance, in one embodiment, reports may be personalized by specifying the data and format of data to be included in a personalized instance of the report. In addition, in some embodiments, a user can personalize a report by specifying that certain report parameters—required to generate an instance of a report—are to be reused during a subsequent request for the same report. In some embodiments, specifying report personalization preferences for a particular report results in a file being generated to store the personalization preferences, for example, within a personal content directory of a user. The personalization preferences may be stored on a per-user and per-report basis, such that each individual user of the online enterprise portal can generate a personalized instance of any report, without modifying the master report definition on which a report is based.

Consistent with an embodiment of the invention, when a request is received for a particular report, the request is analyzed to determine which report is being requested and who (e.g., which user) has requested the report. Based on the specific report being requested and the particular user requesting the report, a determination is made as to whether the user has established any report personalization preferences for the requested report. If no personalization preferences have been established by the user, the original or master report definition is used to generate an instance of the report with no further modifications. However, if the user has established report personalization preferences, the personalization preferences are used to generate a personalized instance of the report. For instance, in some embodiments, the master report definition is modified in accordance with the personalization preferences, such that the resulting report is personalized based on processing the modified report definition. Alternatively, in some embodiments, the master report definition is used to generate an instance of the report, and then the personalization preferences are used to modify the instance of the report to generate a personalized instance of the report. In any case, the personalization preferences can be utilized to generate the personalized report at runtime, for example, in response to a request from a user. Because the personalization preferences for a particular report are established and stored independent of the corresponding master report definition for the report, but operate in conjunction with the master report definition, any changes made to the master report definition subsequent to establishing the personalization preferences will automatically be reflected in a personalized instance of the report. Furthermore, the user is presented with a single report selection (e.g. report name) for each available report, as opposed to forcing the user to choose between a master report and one or more customized reports having slight variations from the master report, on which the customized reports are based. When a user selects a particular report, for example, by manipulating a cursor control device (e.g., mouse) to select or "click" a report name, or some other representation of the report, if personalization preferences exist for the selected report, the personalization preferences will automatically be used to generate an instance of the report. If no personalization preferences exist, the master report definition associated with the selected report is used to generate the report with no further modifications being made.

In some embodiments, a user can establish reusable report parameters that can automatically be utilized to generate an instance of a report. For example, in some embodiments, when a user selects a report to view, a determination is made as to whether the report definition for the corresponding selected report requires report parameters in order to generate an instance of the report. If report parameters are required, and the user has not previously established report parameters, the user will be prompted to provide or select the report parameters. The user will also be prompted to save the report parameters for subsequent use in processing a request for the same report. Accordingly, during a subsequent request for the same report, a determination is made as to whether the user has established report parameters for use with the report definition in generating an instance of the report. If report parameters have previously been established, the report parameters will automatically be used to generate an instance of the report, thereby saving the user the time that would otherwise be required to specify or select report parameters for use in generating an instance of the report.

Other aspects of the invention will become apparent from the detailed description that follows.

DESCRIPTION OF THE DRAWINGS

Some embodiments are illustrated by way of example and not limitation in the figures of the accompanying drawings, in which.

DETAILED DESCRIPTION

Figure 1:
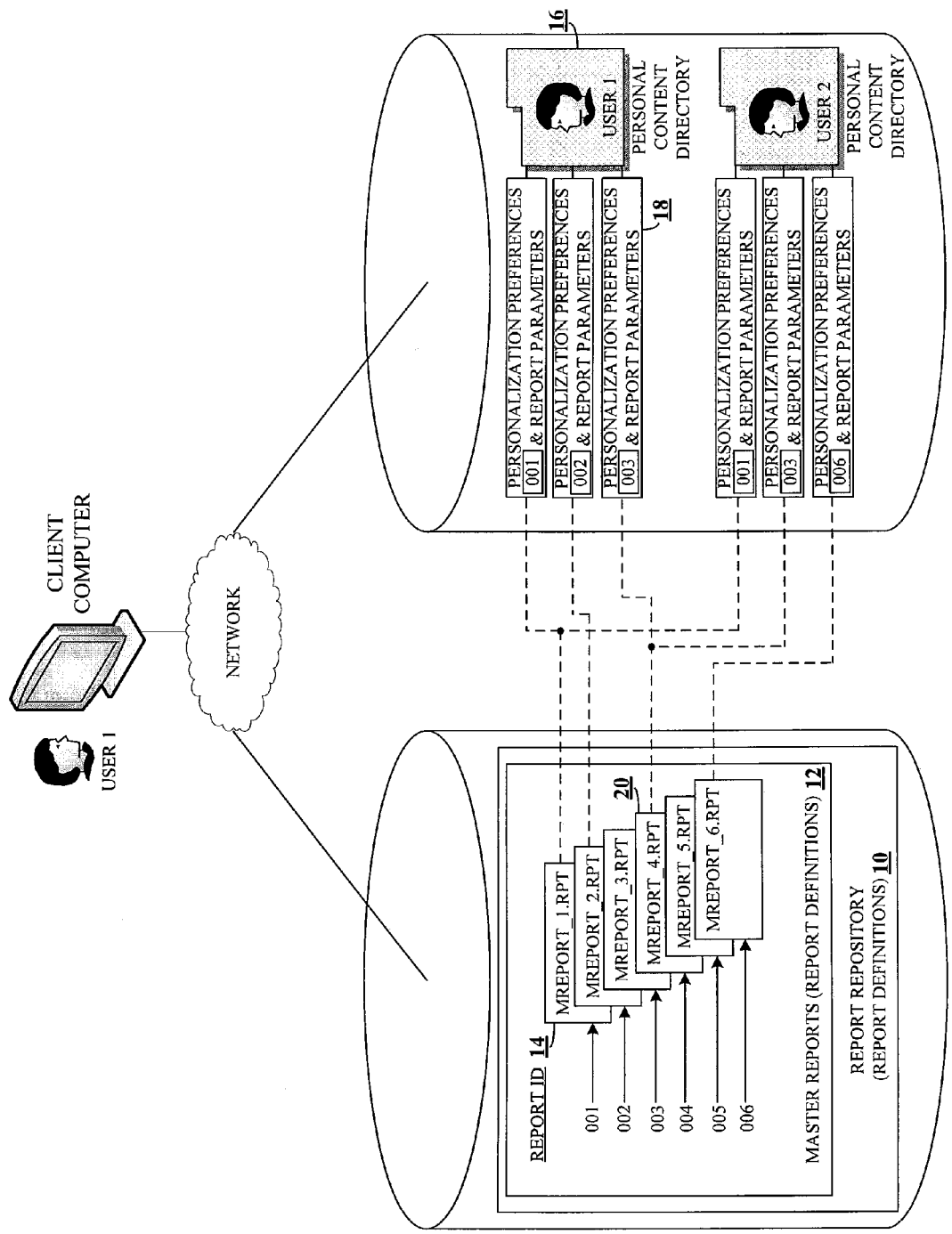
FIG. 1 is a block diagram illustrating a general framework for generating personalized reports with report personalization preferences defined on a per-user and per-report basis, according to an embodiment of the invention.

Methods and systems for generating personalized reports are described. In the following description, for purposes of explanation, numerous specific details are set forth in order to provide a thorough understanding of example embodiments of the present invention. It will be evident, however, to one skilled in the art that the present invention may be practiced without these specific details.

Consistent with an embodiment of the invention, a computer-implemented report generating application or service enables a user to personalize a report by specifying data to be included in a personalized instance or version of the report, and by specifying the format of the data to be included in the personalized instance of the report. Accordingly, a user can save personalization preferences, such that the personalization preferences can be utilized automatically to generate a personalized instance of a report at runtime, for example, in response to a user requesting to view a report. In addition, report parameters used to generate an instance of a particular report can be saved and automatically used during a subsequent request for the same report. A report parameter may include some form of user input (e.g., a date range) for use in querying or selecting data to be included in the report.

After a user has established personalization preferences for a particular report, when the user requests to view an instance of the report, the report generating application generates a personalized instance of the report in accordance with the report personalization preferences established by the user. In one embodiment, when a user establishes personalization preferences for a particular report, the report personalization preferences will be stored in a file separate from the master report definition for the report. Accordingly, when a user requests to view a particular report, if personalization preferences for the report have been established, the report will be generated in accordance with the personalization preferences. If, on the other hand, no personalization preferences have been established for the selected report for the requesting user, the original or master report definition will be utilized to generate an instance of the requested report, with no further modifications to the report. Because the personalization preferences for a particular report are established and stored independent of the corresponding master report definition for the report, but operate in conjunction with the master report definition to generate an instance of a report, any changes made to the master report definition subsequent to establishing the personalization preferences will automatically be reflected in a personalized instance of the report. For instance, any change made to the master report definition will automatically carry over or flow through to the user's personalized version of the report. Various additional aspects of the invention are described below in connection with the description of the figures.

FIG. 1 illustrates an example of a general framework for generating personalized reports with report personalization preferences defined on per-user and per-report bases, according to an embodiment of the invention. As illustrated in FIG. 1, a report repository 10 stores report definitions corresponding to the reports available to the users of an enterprise, business entity, or organization. In particular, the report repository 10 stores master report definitions 12. A master report definition, such as "MREPORT_1.RPT" 14, is a report definition that has special characteristics or attributes, such as being read-only to all but a limited number of users. A master report definition may, for example, be provided as a default report definition for a particular type of report (e.g., a quarterly revenue report). Accordingly, it will typically be desirable to prevent ordinary users from purposefully, or inadvertently, modifying a master report definition. Consequently, the access privileges for a master report definition will typically be set to prevent all users, with the exception of a report administrator, from modifying the master report definition.

In general, a master report definition specifies both the data content to be included in a report as well as the format of the content. For example, the content may be specified in the form of one or more queries to be executed against one or more particular data sources, such as a database table. Accordingly, the data to be included in an instance of a report are selected at runtime. In addition, each report definition typically includes commands, directives and/or instructions that specify how the content is to be formatted and displayed. Additionally, in some embodiments, the commands, directives and/or instructions included in a report definition will specify a data connection type to be used when establishing a connection with a data source to be queried. In some embodiments, the report definition may include formulas for calculating or deriving data values based on data values received as a result of processing a query. These data queries, commands, directives and instructions are executed or processed when a report server processes the report definition in response to a user requesting the report. Accordingly, processing a report definition results in the generation of an instance of the report. Each report available to a user is associated with a corresponding master report definition. For those specific reports for which a user has established personalization preferences and/or report parameters, a file containing the personalization preferences and/or report parameters for the particular report will exist in the user's personal content directory 16. In some embodiments, the file with the personalization preferences and/or report parameters (e.g., file 18) will include a report identifier that identifies the master report definition with which the personalization preferences are associated. For instance, in FIG. 1, the personalization preferences and report parameters stored in the file with reference number 18 are shown to be associated with the report identifier, "004", which maps the personalization preferences and report parameters to the master report definition with name, "MREPORT_4.RPT" 20. Accordingly, when User 1 requests to view the report corresponding with the report definition, "MREPORT_4.RPT" 20, the personalization preferences and report parameters in the file 18 in the user's personal content directory will be used to generate a personalized instance of the report.

It will be appreciated by those skilled in the art that FIG. 1 depicts one of many ways in which report definitions might be stored and associated with user's personalization preferences on a per-user and per-report basis. For instance, in other embodiments, the personalization preferences and report parameters may be stored in a manner that differs from what is depicted in FIG. 1. For instance, as opposed to being stored within a directory and file of a file system, personalization preferences and report parameters might be stored within a table of a database system. Additionally, although reports are to be generated on a per-user and per-report basis, it is not necessarily the case that in every embodiment the personalization preferences and report parameters of users will be stored on a per-user basis. For instance, in some embodiments, report personalization preferences and report parameters for multiple users might be stored within the same file or same database table. In some embodiments, a mapping of a report to a report definition exists within a personal content directory of a user only for those reports that have been personalized. For instance, a separate mapping mechanism might be used for master report definitions which do not have corresponding personalization preferences. Regardless of the specific manner in which the report definitions and personalization preferences are stored and mapped to the names of reports, they will generally be stored in such a manner that allows each user to personalize a report without impacting the original report definition, such that any change made to the original or master report definition will not negatively affect a user's personalization preferences, and such changes will automatically flow through to each user's personalized reports. Furthermore, those skilled in the art will readily appreciate that the naming convention used in the example of FIG. 1 is for illustrative purposes. In various embodiments of the invention, any number of naming conventions, directory structures or database schemas might be utilized.

Figure 2:
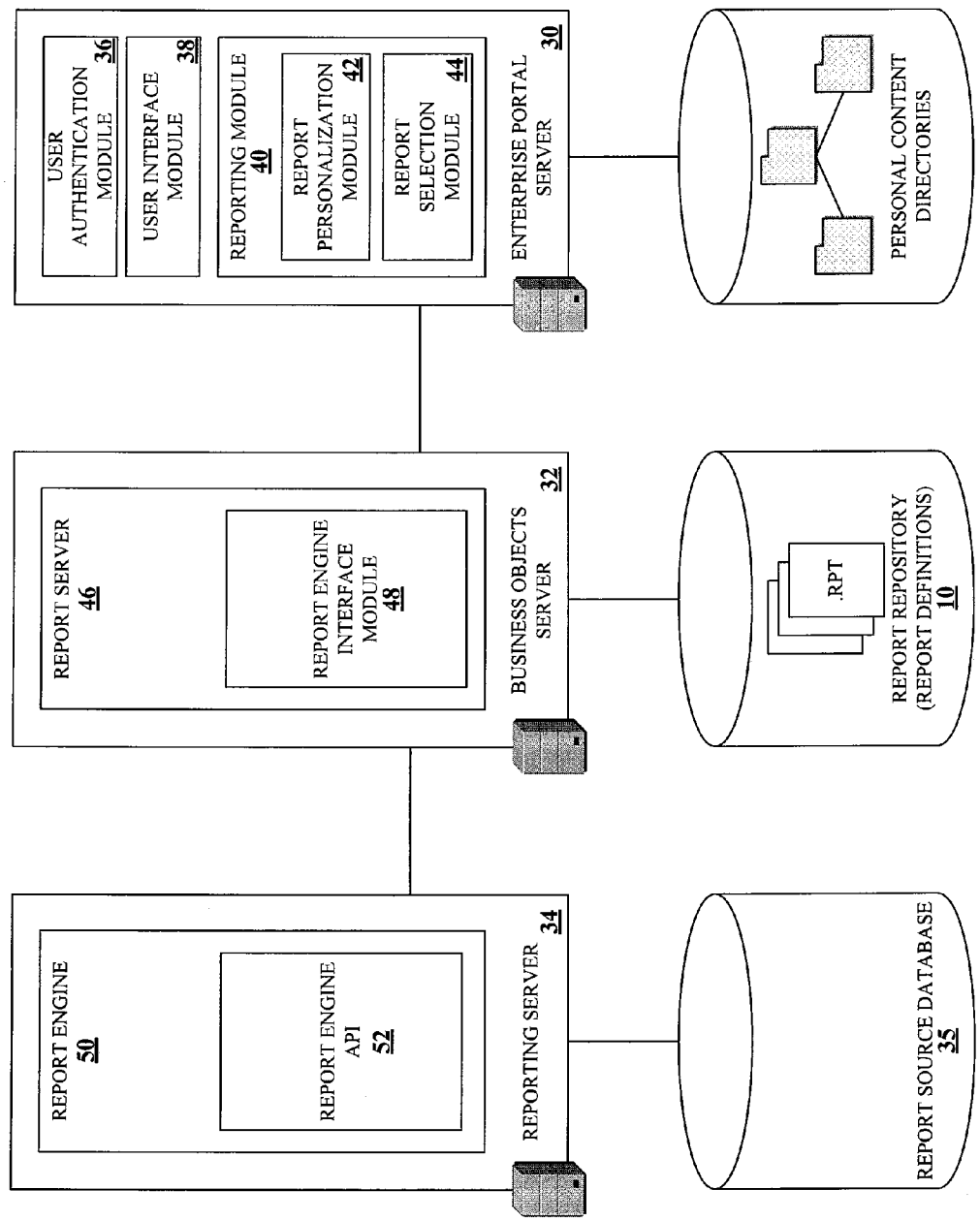
FIG. 2 is a block diagram illustrating a high level view of a general system architecture for generating personalized reports, according to an embodiment of the invention.

FIG. 2 is a block diagram illustrating a high level view of the system architecture of a system for generating personalized reports, according to an embodiment of the invention. It will be appreciated that the system architecture shown in FIG. 2 is provided as an example and that many variations are possible without departing from the scope and spirit of the invention. In various alternative embodiments, one or more independent functional components or modules shown in FIG. 2 might be combined as a single component or module, or combined with any number of additional components or modules not shown in FIG. 2. In particular, the system architecture shown in FIG. 2 includes three separate server computers 30, 32 and 34. In alternative embodiments, the logical and functional components and modules attributable to a particular server computer in FIG. 2 may be combined on a single server computer. That is, the software instructions that make up one of the individual modules shown in FIG. 2 may reside and be executed on a single computer, or be distributed across computers in a manner different from what is depicted in FIG. 2, without departing from the broader spirit and scope of the invention.

As illustrated in FIG. 2, there is an enterprise portal server 30, a business objects server 32, and a reporting server 34. The three servers provide a set of distinct functions that together comprise a reporting application or service, enabling the generation and viewing of personalized reports. In general, the enterprise portal server 30 provides a front-end and user interface via which users interact with a reporting service. For instance, the enterprise portal server 30 includes a user interface module 38, which in conjunction with a web server or web application server (not shown), facilitates the presentation of a list of user-selectable reports. Upon selecting a report to view, a request is generated and communicated from the user's web browser application or the enterprise portal server 30 to the business objects server 32. The request is processed by the report server 46 of the business objects server 32, which, in turn, processes a report definition stored in the report repository 10. For instance, the user-initiated request to view a report may include a report identifier to identify the particular report definition on which the instance of the report will be based. As part of processing the report definition, one or more commands are communicated from the business objects server 32 to the report engine API 52 of the reporting server 34. For example, the report engine interface module 48 may direct queries to the report engine API module 52. The queries are then processed by the report engine 50, which selects data, for example, from the report source database 35, or some other data source. This selected data is then communicated to the report server 46 of the business objects server 32, where it is further processed in accordance with any formatting commands, directives or instructions of the report definition to generate an instance of the selected report. As described in greater detail below, if personalization preferences have been established for the selected report, the instance of the report will be generated in accordance with the personalization preferences before it is communicated to the user's web browser or client application for display.

In one embodiment, the enterprise portal server 30 may be an implementation of SAP Enterprise Portal (also referred to as SAP NetWeaver Portal), which is a bundle of software providing users with role-specific, web-based and secure access to a wide variety of relevant information, applications and services for a business entity. In the case of the SAP Enterprise Portal, the enterprise portal 30 contains the NetWeaver components: Portal, Knowledge Management, and Collaboration. In addition, the enterprise portal 30 may include other predefined content. Typically, a user of an enterprise portal will utilize a web browser application to access applications and services after having been authenticated by the user authentication module 36 of the portal. As shown in FIG. 2, the enterprise portal 30 includes a user interface module 38 which, in conjunction with a web server and/or web application server (not shown), provides a user with a graphical user interface by which the user interacts with the various applications and services, including the reporting application or service.

The reporting module 40 serves as a front-end for the reporting service embodied in-part in the business objects server 32 and reporting server 34. Accordingly, in one embodiment, the reporting module 40 of the enterprise portal 30 includes a report personalization module 42 and a report selection module 44. The report personalization module 42 includes the logic and user interface elements for allowing a user to personalize a report. For instance, in one embodiment, the report personalization module 42 enables the personalization of a report via a user interface such as that depicted in FIG. 3, and described in greater detail below. In one embodiment, during a user session, as data flows between a user's web browser and the enterprise portal, the reporting module 40 communicates with the business objects server 32 and reporting server 34 as is necessary. For example, in some embodiments, after a user submits a request to view a report for which personalization preferences have been established, the request may be forwarded to the business objects server 32, where it is received and processed.

In some embodiments, personalization preferences and report parameters are communicated to the business objects server 32 with the initial request to view a report. Accordingly, the personalization preferences and report parameters may be processed by the report server 46 in conjunction with the master report definition associated with the selected report. In such a case, any query specified by the master report definition might be tailored, based on a personalization preference or report parameter, such that only relevant data is selected by the report engine 50 for inclusion in the personalized instance of the report. Alternatively, personalization preferences may be processed subsequent to the data selection process, such that certain data returned to the report server 46 by the report engine 50 are discarded, if a personalization preference indicates the data are not to be included in the personalized instance of the report. In yet another embodiment, the personalization preferences are not communicated to the report server 46, but instead are processed at the reporting module 40 of the enterprise portal server 30. For instance, in some embodiments, an instance of the requested report is generated in accordance with the master report definition, and then communicated to the enterprise portal server 30 where it is personalized in accordance with the personalization preferences established for that particular report, before being communicated to the user's web browser to be displayed.

The report selection module 44 includes the logic and user interface elements for presenting reports to a user for selection. For instance, after logging in to the enterprise portal 30, a user may opt to view a list of reports available to the user by selecting a link to a reporting service. In one embodiment, the report selection module 44 includes logic to query the reporting server 34, or the business objects server 32, for a list of reports accessible to the particular user. The list of reports available to the user may be generated in real time, based on the user's credentials (e.g., username, password, enterprise-assigned role) and returned to the report selection module 44, which in turn, causes the list of reports available to the user to be displayed. For instance, a web page may be presented to the user with a listing of selectable links to the accessible reports. In one embodiment, a single report listing will be provided for an available report regardless of whether the user has established personalization preferences for the report. Accordingly, if a user has established personalization preferences for a particular report, the single report listing for that particular report, when selected, will cause the report server 46 to generate a personalized instance of the report in accordance with the user's personalization preferences. If the user has not established personalization preferences for the particular report, the single report listing for that particular report, when selected, will cause the report server 46 to generate an instance of the report in accordance with the master report definition, with no further modifications. In an alternative embodiment, two selectable reports may be displayed to the user—a first selectable report corresponding to the master report definition, and a second selectable report corresponding to a personalized view of the report based on the user's personalization preferences for the particular report.

When a user selects a report from the displayed list of reports, the report selection module 44 detects and processes the selection. In one embodiment, the report selection module 44 determines whether the user has established personalization preferences for the selected report. For instance, the report selection module 44 identifies the existence of a particular file within the requesting user's personal content directory. Assuming the file exists, the report selection module 44 reads mapping information, such as a report identifier, from the file. The mapping information maps personalization preferences and/or report parameters to a master report definition to be used when generating the requested report for the particular user. In some embodiments, a file will exist in the user's personal content directory only for those reports that have been personalized by the requesting user. Accordingly, if the report selection module 44 determines that no file exists in the personal content directory of the user for a particular selected report, the master report definition is automatically used to generate the requested report. Regardless of how the actual mapping is implemented, once the report selection module 44 has determined the report definition to be used for the selected report, a command or request is communicated to the report server to request that an instance of the report be generated.

In one embodiment, the report server 46 receives a request to generate a report using a master report definition that is identified by a report identifier. For instance, a command or request received from the enterprise portal server 30 includes a report identifier specifying a report definition to be used to generate an instance of a report. The report server 46 processes the identified report definition, which includes directing one or more commands including a query to the report engine 50 of the reporting server 34. The command received at the reporting server 34 will generally be consistent with an application programming interface (API) command in accordance with the report engine API 52 of the reporting server. Accordingly, the report engine interface module 48 of the business objects server 32 may direct a query to the report engine 50. The query may, for instance, be based on, or directly read from, the report definition being processed to generate the requested report. In some embodiments, the query may be based in part on a personalization preference of the user for the requested report. The report engine 50 processes the query and selects the appropriate data from various data sources, and communicates the selected data to the report server 46 where the data are formatted in accordance with formatting directives in the report definition. In some embodiments, the data may be formatted in accordance with personalization preferences that are processed at the report server 46. Alternatively, the personalization preferences may be processed at the report personalization module 42 of the enterprise portal server 30. Finally, the user interface module 38 of the enterprise portal server 30 generates a view of the report for display to the user. In one embodiment, the report is "wrapped" in accordance with an iView associated with the enterprise portal server 30.

Figure 3:
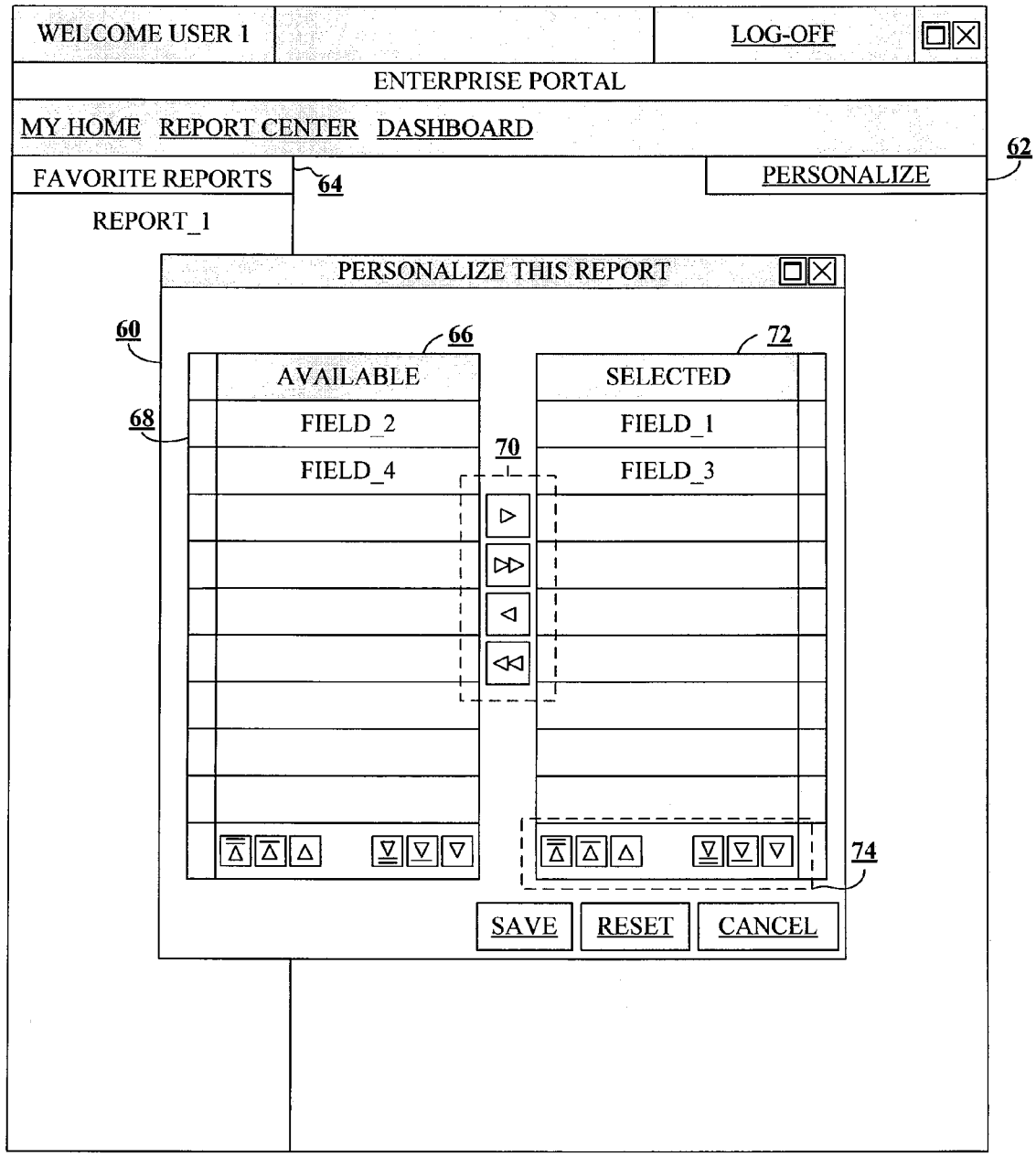
FIG. 3 illustrates an example of a user interface for personalizing a report, according to an embodiment of the invention.

FIG. 3 illustrates an example of a user interface for personalizing a report, according to an embodiment of the invention. As illustrated in FIG. 3, in one embodiment, a report personalization module has a user interface, which facilitates the selection of data for inclusion in a personalized instance of a report. In the user interface of FIG. 3, a user accesses the personalization view (e.g., window 60) by selecting or pressing the "PERSONALIZE" button 62 in the upper right corner, after selecting a report to personalize, for example, from the list of reports shown under "FAVORITE REPORTS" 64.

Once the personalization view is displayed, the user can add data fields from the list of data fields shown in the box 66 with heading "AVAILABLE" by clicking on the corresponding box to the left of a particular field (e.g., box 68 for the field with name, "FIELD_2"). Then, the user can utilize the buttons 70 to move a data field to the box 72 with heading "SELECTED." Similarly, a data field can be moved from the "SELECTED" column to the "AVAILABLE" column. In this manner, the user can include or exclude data fields, which will cause those data fields to be included or excluded in the instance of the personalized report. In addition to including or excluding certain data fields from the report, by manipulating the arrow buttons 74 shown at the bottom of the "SELECTED" column, a user can change the order of the selected fields, thereby changing the appearance of the fields in the generated report. It will be appreciated that the user interface shown in FIG. 3 is provided as an example, and in various alternative embodiments, the user interface may be different from what is depicted in FIG. 3 without departing from the scope and spirit of the invention.

Figure 4:
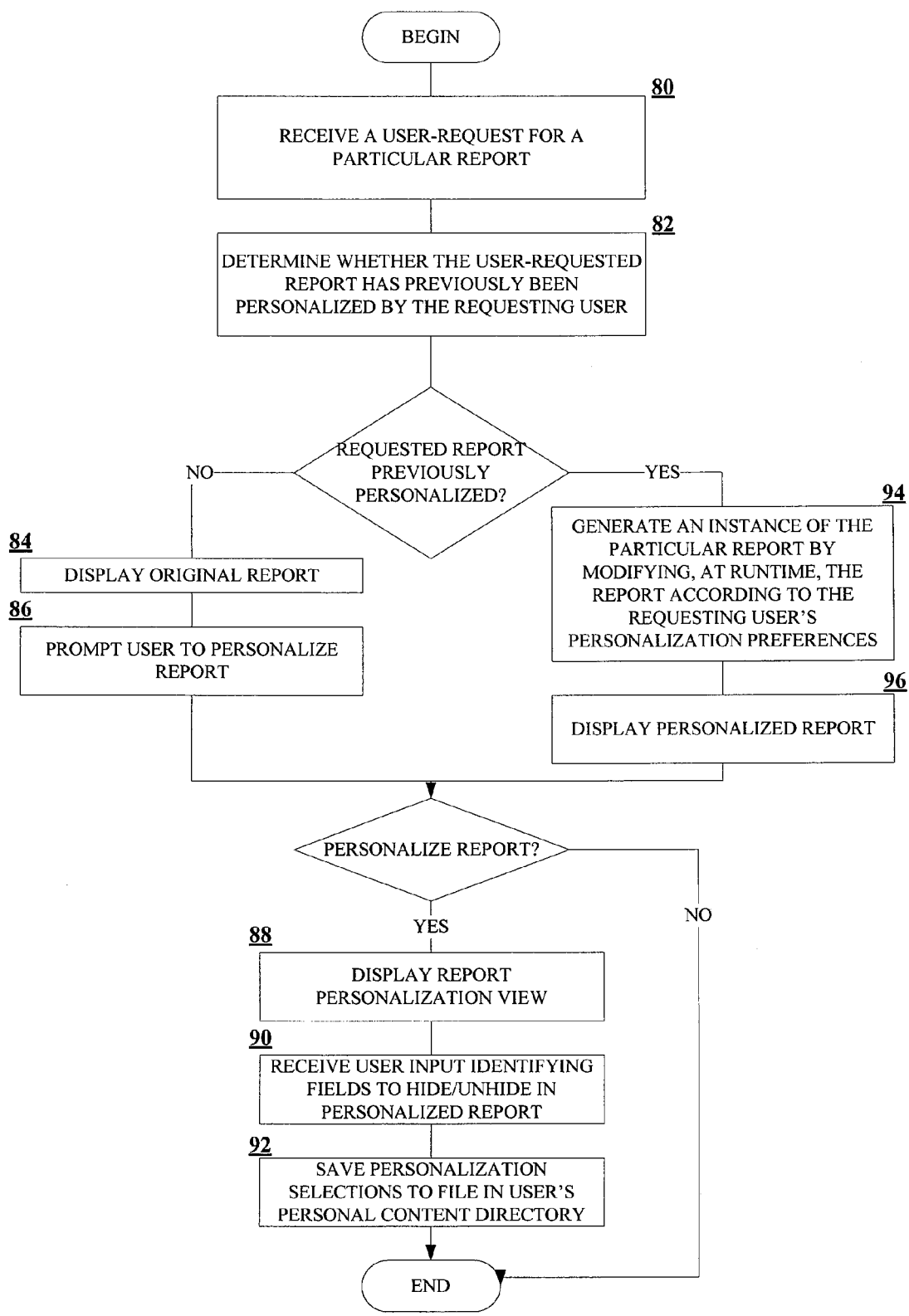
FIG. 4 is a flow diagram illustrating the method operations of a method for personalizing a report, according to an embodiment of the invention.

FIG. 4 is a flow diagram illustrating the method operations of a method for personalizing a report, according to an embodiment of the invention. The method begins when, at method operation 80, a user-initiated request for a particular report is received. For instance, after a user logs in to the enterprise portal, the user may be presented with a user interface view that provides a list of reports that the user is authorized to access (e.g., generate and view). This list may be generated automatically by polling for, or otherwise requesting, the list from the report server or some other component or module tasked with managing the repository of reports. In any case, the list of reports accessible to the user is displayed to the user in such a manner that the user can select a report, for example, by clicking on the name of the desired report. When a report is selected, a request for the selected report is generated and communicated from the client computer to the enterprise portal.

At method operation 82, once a particular report has been identified by way of the report request, it is determined whether the user-requested report has previously been personalized by the requesting user. For example, if a user has previously established report personalization preferences for the requested report, a file containing the user's personalization preferences for the report will reside in a predetermined directory of the user. Accordingly, determining if a user has established personalization preferences for a report may be as simple as identifying a file with a particular filename in a predetermined directory of the user. In such a scenario, the existence of a file in the predetermined directory indicates that the user has previously established personalization preferences. The file may include mapping information mapping the name of the selected report to a report identifier associated with a master report definition used to generate the requested report. For instance, the report identifier will be associated with and identify a master report definition used to generate an instance of the report. However, if no file is found within the personal content directory of the user, it can be assumed that no personalization preferences for the requested report have been established by the user. In such a case, the master report definition for the requested report is automatically used to generate the instance of the selected report. In other embodiments, the manner in which the determination is made will differ.

If it is determined that the requesting user has not previously established personalization preferences for the requested report, at method operation 84 the original requested report is displayed. In such a case, the original report is generated based on the master report definition for the report. That is, the original report is displayed without processing any personalization preferences of the user. Before displaying the report, the report definition identified in the request is processed by a report server, and in some cases a report engine, to generate an instance of the report. The data representing the instance of the report will then be formatted in accordance with an enterprise portal iView. For instance, in some embodiments such as those utilizing the SAP Enterprise Portal, an instance of a report will be wrapped in an iView—a web-based visual representation of an application, information or service with a unique Uniform Resource Locator (URL)—and then communicated to the user's client machine to be rendered and displayed to the user.

In some embodiments, once the user is done viewing the report, the user may be prompted to personalize the report, as indicated at method operation 86. If the user selects an option indicating a desire to personalize the report, at method operation 88 a report personalization view or user interface is displayed. The report personalization view may be similar in concept to the user interface depicted in FIG. 3, and described above. In any case, at method operation 90, user input is received identifying those data fields which are to be shown (unhidden) or not shown (hidden) for a personalized instance of the report. This may be accomplished, for example, by manipulating user interface buttons and/or clicking the names of the desired columns to be included in the report. Once the data fields or columns to be shown and not shown are selected, at method operation 92 the personalization selections are automatically saved. For instance, by selecting to save the personalization selections, a file in the user's personal content directory may be generated and saved. Accordingly, the next time the report is requested by the user, the personalization preferences stored in the user's personal content directory will be accessed and utilized to personalize the instance of the report.

If it is determined at method operation 82 that a user has previously personalized the report being requested, then at method operation 94 the requested report will be generated by modifying the report according to the requesting user's personalization preferences, as those preferences are specified within the file corresponding to the requested report in the user's personal content directory. Accordingly, at method operation 94 a personalized instance of the report is generated. This may be achieved in a number of ways. In some embodiments, the personalization preferences associated with the report selected by the user in connection with method operation 80 will be processed by a report server, for example, residing on a business objects server. The resulting instance of the report will then be communicated to a reporting module on the enterprise portal, which will format the data for display to the user. Finally, at method operation 96, the data representing the personalized instance of the report is communicated to the client computer where it is displayed to the user. After displaying the personalized report, the user may be prompted to modify or save the personalization settings that the user had previously established.

Figure 5:
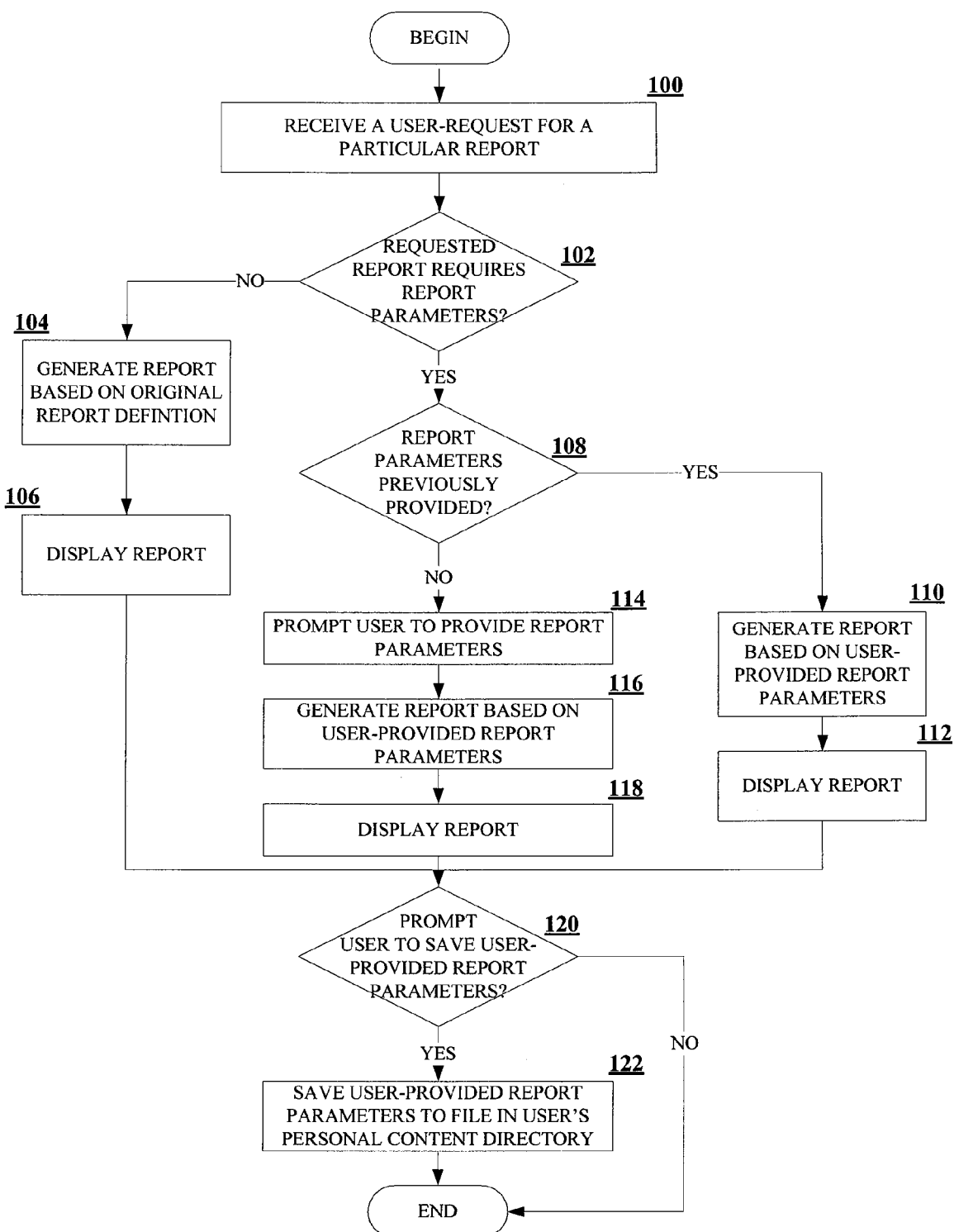
FIG. 5 is a flow diagram illustrating the method operations of a method for personalizing a report with reusable report parameters, according to an embodiment of the invention.

FIG. 5 is a flow diagram illustrating the method operations of a method for personalizing a report with reusable report parameters, according to an embodiment of the invention. The method begins at method operation 100 when a user-initiated request for a particular report is received. As with the method depicted in FIG. 4, the request may be received as a result of a user selecting a report from a list of reports presented in a user interface presented in an Internet document or web page. At method operation 102, it is determined whether the user-requested report requires report parameters to be provided by the user in order to generate the report. For example, some report definitions require that certain report parameters are included or specified along with the report request in order for the report definition to be processed properly. One example of a required report parameter is a date range. Of course, any number of other report parameters might be required, depending upon the report definition. If report parameters are not required to generate the report, at method operation 104 an instance of the report is generated based on the report definition. At method operation 106, the instance of the report is displayed to the user. For instance, the generated report data may be communicated from the report engine of the reporting server to a client machine of the user (via one or more intermediate components), where it is rendered and displayed to the user in accordance with the original report definition.

If at method operation 102 it is determined that report parameters are required in order for the report to be generated, then at method operation 108 it is determined whether the user has previously specified report parameters to be used for generating the selected report. For instance, in some embodiments, a reporting application executing on the enterprise portal where the report request is received may attempt to locate a file in the requesting user's directory with the previously specified report parameters. If the file exists and includes specified report parameters for the requested report, the report parameters can be used to generate the report without prompting the user to provide the report parameters a second time. Accordingly, if it is determined that the report parameters exist, at method operation 110, an instance of the requested report is generated using the previously specified report parameters. For example, the previously established report parameters may be communicated to the report server along with the request to generate the selected report. After the report is generated with the specified report parameters, at method operation 112, the instance of the report is displayed to the requesting user. For instance, the generated report data may be communicated to a client machine where it is rendered and displayed in a browser application window.

If, at method operation 108, it is determined that no report parameters have previously been established by the user for the selected report, then at method operation 114 the user is prompted to provide the report parameters necessary for generating an instance of the selected report. For instance, a web page may be displayed with one or more forms where a user can enter the required data. Alternatively, a user may be provided with a drop down list of data selections available for use as report parameters. In any case, once the report parameters have been provided, at method operation 116, the report is generated based on the user-provided report parameters. For instance, the report definition and the provided report parameters are processed by the report server to generate an instance of the report. At method operation 118 the generated report is displayed to the requesting user.

In some embodiments, after displaying the report that was generated based on the user-provided report parameters, the user is prompted to save the user-provided report parameters to be used the next time the user selects the report. Accordingly, at method operation 120, the user is prompted to save the user-provided report parameters. If the user selects to save the report parameters, then at method operation 122, the report parameters are saved to a file and stored in the user's personal content directory. In some embodiments the file will be named with a filename that is in accordance with a naming convention established for the reporting service. Consequently, the reporting module of the enterprise portal can identify the existence of personalization preferences, including report parameters, by simply determining that a particular file exists in the user's personal content directory.

It will be appreciated that the method operations of the methods illustrated in FIGS. 4 and 5 and described above may be altered to a certain degree without departing from the spirit of the invention. For example, although displayed as two distinct methods in FIGS. 4 and 5, in some embodiments, the methods may be combined in some manner such that a report may be generated with personalization preferences including report parameters. Additionally, one or more of the method operations may occur in an order different from what is proposed in FIGS. 4 and 5. For example, the user may be prompted to save the user-provided report parameters prior to being presented with a view of the generated report. Without departing from the spirit of the invention, other modifications to the methods are possible as well.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 6:
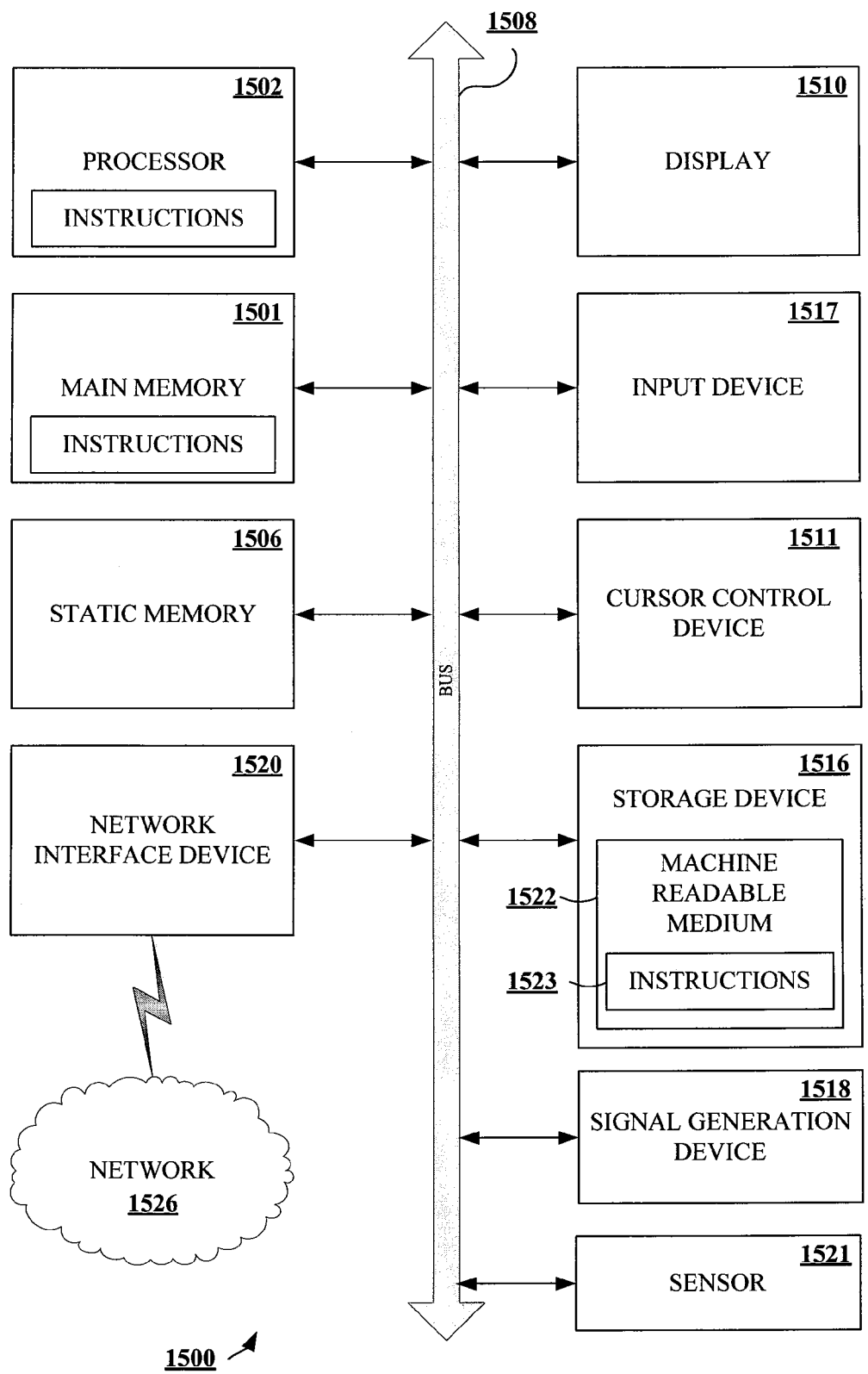
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for generating a personalized report, the method comprising:

using one or more processors to execute instructions retained in one or more instances of machine-readable media to perform operations comprising:

receiving at a server, a request to display a report, the request being associated with a user and identifying the report to be displayed, the server hosting personalization preferences specified on a per report and per user basis;

determining at the server that the user has established personalization preferences for the report by identifying within a directory of the user a first file having a report identifier mapping the user's personalization preferences to a report definition included in a second file, the first file specifying the user's personalization preferences for the report identified in the request;

generating an instance of the report by processing the report definition included in the second file and associated with the report identified in the request;

processing the instance of the report by selecting data specified by the personalization preferences and formatting the selected data in the instance of the report in accordance with the personalization preferences included in the first file to generate the personalized instance of the report; and causing the personalized instance of the report to be displayed.

2. The method of claim 1, comprising:

communicating a request to a report server to process the report definition, the request including the report identifier identifying the personalized report definition.

3. The method of claim 2, wherein processing the instance of the report in accordance with the personalization preferences includes processing the instance of the report at runtime by selecting data to be included in the report.

4. The method of claim 1, wherein the directory is a directory of the user associated with an online enterprise portal providing users of the enterprise portal with web-based access to the report server.

5. The method of claim 4, wherein receiving a request to display a report includes receiving the request at a first server associated with the online enterprise portal and forwarding the request to a second server executing a process representing the reporting service.

6. The method of claim 1, further comprising:

after receiving the request to display the report, determining that the user has previously saved report parameters required for use with the report definition, the report parameters for use in generating the instance of the report.

7. The method of claim 6, wherein the determining that the user has previously saved report parameters required for use with the report definition includes identifying within a directory a file containing the saved report parameters for the report, the method further comprising:

reading from the file the saved report parameters for the report.

8. The method of claim 1, wherein the personalization preferences are processed independent of the report definition with which they are associated.

9. A report generating system comprising:

a report selection module, executing on one or more processors of a machine, configured to receive a request to display a report, the request being associated with a user and identifying a report to be displayed, and determine that the user has established personalization preferences for the report by identifying within a directory of the user a first file having a report identifier mapping personalization preferences to a report definition included in a second file, the first file including the personalization preferences for the report identified in the request, the report-selection module being a module implemented using a processor of the report generating system;

a report server configured to generate an instance of the report by processing the report definition included in the second file and associated with the report identified in the request;

a report personalization module to process the instance of the report by selecting data specified by the personalization preferences and formatting the selected data in the instance of the report in accordance with the personalization preferences included in the first file to generate the personalized instance of the report, the report personalization module being implemented by the one or more processors; and a user interface module configured to cause the personalized instance of the report to be displayed.

10. The report generating system of claim 9, wherein the report selection module is further configured read from the first file the personalization preferences for the report.

11. The report generating system of claim 10, further comprising:

a report engine configured to select data to be included in the report in accordance with one or more queries specified in the report definition.

12. The report generating system of claim 9, wherein the directory is a directory of the user associated with an online enterprise portal providing users of an enterprise with web-based access to a reporting service.

13. The report generating system of claim 12, wherein the report selection module is further configured to receive the request to display the report and forward the request to the report server.

14. The report generating system of claim 9, wherein the report selection module is further configured to determine, after receiving the request to display the report, that the user has previously saved report parameters required for use with the report definition, the report parameters for use in generating the instance of the report.

15. The report generating system of claim 14, wherein the report selection module is further configured to identify within a directory a file containing the saved report parameters for the report, and read from the file the saved report parameters for the report.

16. The report generating system of claim 9, wherein the personalization preferences are processed independent of the report definition with which they are associated.

17. A method for generating a report, the method comprising:

using one or more processors to execute instructions retained in one or more instances of machine-readable media to perform operations comprising:

receiving at a server a request to display a report, the request being associated with a user and identifying a specific report definition for a report to be displayed, the server hosting one or more files in a directory of the user with which the request is associated, each file specifying report parameters for personalizing a report generated with a report definition;

determining that the specific report definition identified in the request requires user-provided report parameters to be provided in order to generate a personalized instance of the report;

determining that the user has previously established report parameters for use in generating the personalized instance of the report by identifying within the directory of the user a first file having a report identifier mapping the user's personalization preferences to the specific report definition included in a second file, the first file specifying the user's personalization preferences for the report identified in the request;

generating an instance of the report by processing the specific report definition included in the second file and associated with the report identified in the request;

processing the instance of the report by selecting data specified by the personalization preferences and formatting the selected data in the instance of the report with the previously established report parameters included in the first file to generate the personalized instance of the report based on the previously established report parameters for the report; and causing the personalized instance of the report to be displayed.

18. The method of claim 17, wherein the receiving a request to display a report includes receiving the request at a first server associated with an online enterprise portal and forwarding the request to a second server executing a process representing a reporting service.

* * * * *